United States Patent [19]

Whisenant

[11] Patent Number: 4,462,241
[45] Date of Patent: Jul. 31, 1984

[54] WHEEL ALIGNMENT DEVICE

[76] Inventor: Charles T. Whisenant, 2121 4th St., Brunswick, Ga. 31520

[21] Appl. No.: 398,835

[22] Filed: Jul. 16, 1982

[51] Int. Cl.$^3$ ............................................. B21D 1/12
[52] U.S. Cl. ...................................... 72/458; 72/704; 280/661
[58] Field of Search ................. 280/661; 72/458, 704, 72/461, 705, 386

[56] References Cited

U.S. PATENT DOCUMENTS

| | | | |
|---|---|---|---|
| 2,365,731 | 12/1944 | Simons | 72/458 |
| 2,635,668 | 4/1973 | Redinbaugh | 72/458 |
| 3,147,025 | 9/1964 | Good | 280/661 |
| 3,497,233 | 2/1970 | Bolaski et al. | 280/661 |
| 4,030,737 | 6/1977 | Bridges | 280/661 |
| 4,103,531 | 8/1978 | Daniel | 72/461 |
| 4,117,709 | 8/1978 | Jackson | 72/386 |
| 4,296,626 | 10/1981 | Jarman et al. | 72/392 |

Primary Examiner—Richard A. Bertsch
Attorney, Agent, or Firm—Harvey B. Jacobson

[57] ABSTRACT

A mount is provided having a central portion defining first and second sides and provided with a plurality of openings formed therethrough for support of the mount from a vehicle hub wheel mounting portion with the first side of the mount opposing the hub. The mount includes remote lever arm portions extending outwardly from the central portion in opposite directions generally normal to a ray normal to the first side of the mount and an anchor arm is carried by one of the lever arm portions and projects outwardly of the second side of the mount. An elongated lever arm is also provided and has one end portion pivotally supported from the anchor arm outer end for oscillation about an axis transverse to the lever on end of the anchor arm and the other end portion of the lever arm spaced laterally outwardly from the second side of the mount in registry with the other lever arm portion. Hydraulic jack structure is operatively associated with the other end portion of the lever arm and the other lever arm portion for jacking the latter away from the former and elongated tension member structure is provided including one end for releasable anchoring to the upper end portion of a McPherson strut and structure at the other end for selective releasable connection to selected ends of the lever arm.

10 Claims, 6 Drawing Figures

WHEEL ALIGNMENT DEVICE

BACKGROUND OF THE INVENTION

Vehicles equipped with McPherson strut wheel suspension units usually are not equipped with adjustment features whereby the caster and camber of an associated wheel may be adjusted as needed.

Accordingly, if a McPherson strut equipped vehicle strikes a pot hole or curb or is involved in an accident, in many instances the caster and/or camber of a McPherson strut supported wheel thereof will be adversely changed.

While various forms of tools heretofore have been designed to assist in correcting the camber and/or caster of a McPherson strut wheel suspension system as well as other types of suspension systems, most of these tools are not designed in a manner to facilitate ease of the necessary strut bending to accomplish desired changes in caster and camber settings. Accordingly, a need exists for an improved form of tool which may be quickly and efficiently utilized to bend a strut assembly in a manner to achieve a desired change in the associated camber and/or caster.

Examples of tools including some of the general structural and operational features of the instant invention and which have been provided for effecting bending adjustments to wheel support systems are disclosed in adjustments to wheel support systems are disclosed in U.S. Pat. Nos. 2,365,731, 2,635,668, 4,103,531, 4,117,709 and 4,296,626.

BRIEF DESCRIPTION OF THE INVENTION

The wheel alignment device of the instant invention comprises a plate including a central portion and inner and outer sides. The central portion of the plate is provided with openings therethrough which adapt the plate for mounting over the wheel mounting studs carried by a vehicle wheel mounting hub. The plate is mounted to the hub in lieu of the vehicle wheel and includes lever arm portions which project outwardly in opposite directions from the central portion of the plate. One of the lever portions supports an anchor arm therefrom projecting outwardly of the other side of the plate and elongated lever is provided and has one end portion pivotedly connected to the outer end of the anchor arm and the other end portion of the lever spaced outwardly of the outer side of the plate in registry with the other lever arm portion free end. A hydraulic jack is provided and interposed between the free end of the other lever arm portion and the end of the lever registered therewith and an elongated tension member is provided including structure on a first end for anchoring relative to the upper portion of a McPherson strut and means at its other end for releasable attachment to a selected end of the aforementioned lever.

The wheel alignment device is constructed in a manner whereby the force generated by the hydraulic jack thereof is transmitted to the associated spindle assembly and thus to the lower end of the associated McPherson strut by a pair of lever arms acting upon the spindle portion in opposite directions. Thus, a hydraulic jack of lower capacity may be utilized to perform the desired strut bending operation and the pair of lever arms function together to substantially eliminate all but minimal suspension component flexure during a strut bending operation. In this manner, more precise bending of an associated McPherson strut may be achieved.

The main object of this invention is to provide a wheel alignment device which may be utilized to effect precise camber and caster adjustments of vehicle wheels supported from strut-type suspension units such as a McPherson struct.

Another object of this invention is to provide a wheel alignment device in accordance with the preceding object and constructed in a manner whereby only one adapter portion of the device must be changed in order to adapt the device for use in conjunction with two different types of wheel mounting assemblies utilized on substantially all McPherson strut equipped vehicles.

Another object of this invention is to provide an apparatus designed specifically for use in conjunction with readily attachable magnetic alignment gauges.

A further important object of this invention is to provide a wheel alignment device which may also be used to correct fore and aft positioning of McPherson strut-type supported wheels.

A final object of this invention to be specifically enumerated herein is to provide an apparatus in accordance with the preceding objects and which will conform to conventional forms of manufacture, be of simple construction and easy to use so as to provide a device that will economically feasible, long-lasting and relatively trouble free in operation.

These together with other objects and advantages which will become subsequently apparent reside in the details of the construction and operation as more fully hereinafter described and claimed, reference being had to the accompanying drawings forming a part thereof, wherein like numerals refer to like parts throughout.

DETAILED DESCRIPTION OF THE INVENTION

Figure 1:
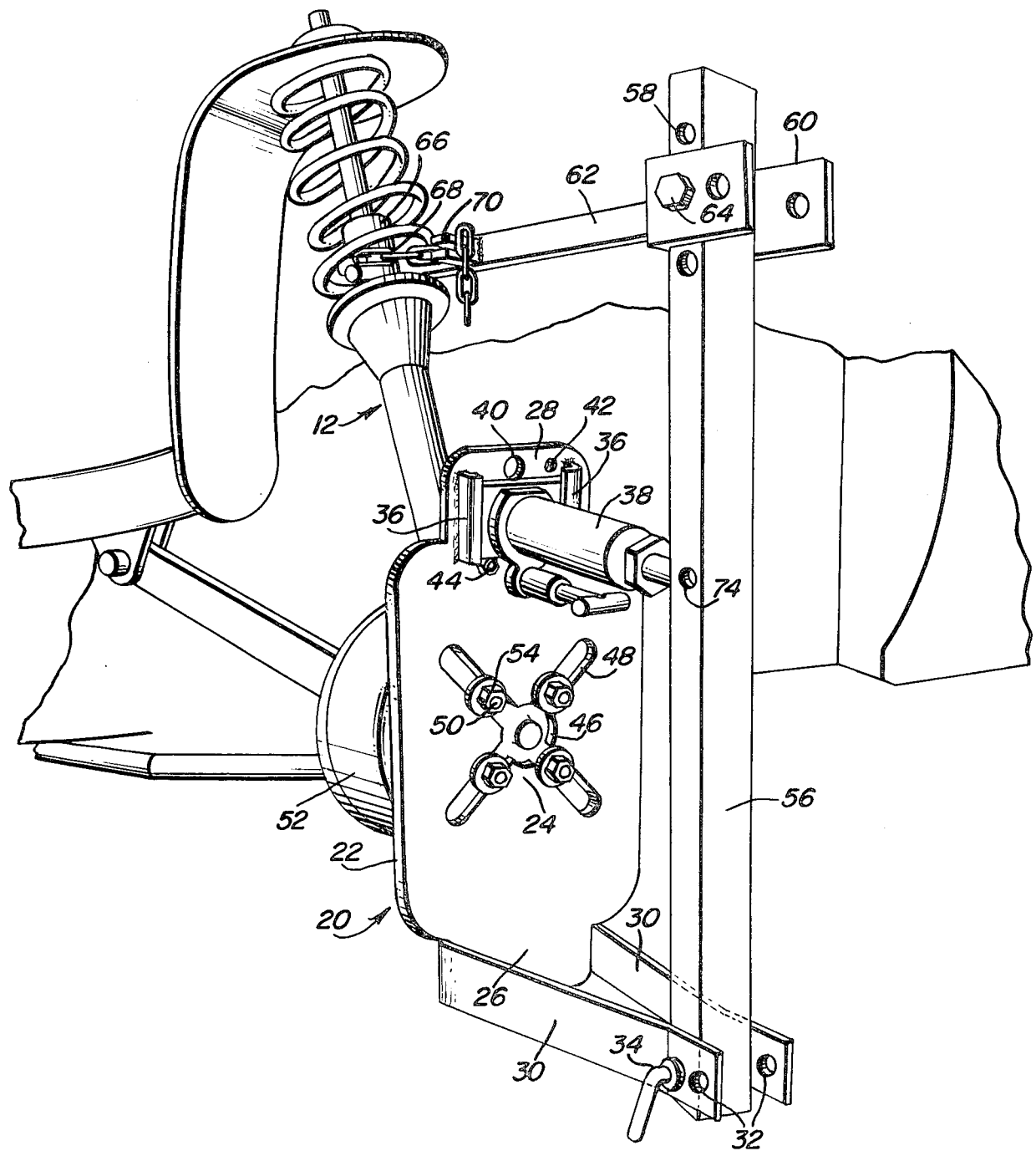
FIG. 1 is a perspective view of the wheel alignment device operatively associated with a typical McPherson strut-supported wheel.

Referring now more specifically to the drawings the numeral 10 generally designates a vehicle including a McPherson strut assembly referred to in general by the reference numeral 12 and from whose lower end a wheel mounting portion such as a spindle assembly 16 is supported. The wheel mounting portion 16 may journal either a brake drum, a brake disk or a plain hub to which the central portion of a vehicle wheel may be mounted through the utilization of wheel lugs or studs.

Conventionally, when it is desired to change the camber of a whell journalled from the spindle 16 the McPherson strut assembly 12 is controllably bent in the lower end area 18 thereof. Although various tools and devices, both manual and powered, heretofore have been provided for effecting the desired bending, these previously known tools and devices have required the application of considerable forces to the spindle 16 and the strut assembly.

The alignment device of the instant invention is referred to in general by the reference numeral 20 and includes a planar mount plate 22 including a central portion 24 and remote lever arm portions 26 and 28 which project outwardly from the central portion 24 in opposite directions. The lever arm portion 26 includes a pair of anchor arms 30 rejecting outwardly therefrom in a direction substantially normal to the medial plane of the mount plane 22. The outer ends of the anchor arms 30 are provided with longitudinally spaced registered bores 32 through which an anchor pin 34 may be selectively secured. In addition the alignment device 20 includes a pair of mounting flanges 36 supported from the lever arm portion 28 and the flanges 36 are adapted to slidably receive opposite side flange portions of the base of a hydraulic jack 38 therein whereby the hydraulic jack may be supported from the lever arm portion 28 in the manner illustrated in FIGS. 1, 2 and 3 of the drawings. The free end of the lever arm portion 28 is provided with a large aperture 40 for purpose to be hereinafter more fully set forth and the lever arm portion 28 also includes a pair of bores 42 and an abutment bolt 44 is secured through one of the bores 42 in order to releasably lock the base of the jack 38 in position supported from the mounting flanges 36.

As may best be seen from FIG. 1 of the drawings, the central portion 24 of the mounting plate 22 is provided with a central opening 46 into which four radial slots 48 open and the slots 48 receive the mounting studs 50 of a brake drum 52 therethrough whereby the studs 50 may be secured through the slots 48 by means of lug nuts 54.

The alignment device 20 further includes an elongated lever arm 56 and one end of the lever arm 56 includes a transverse bore and is pivotedly anchored between the free ends of the anchor arms 30 by the anchor pin 34 passed through one pair of corresponding bores and the adjacent end of lever arm 56. Further, the opposite end of the lever arm 56 includes longitudinally spaced transverse bores 58 and the bifurcated terminal end 60 of a tension arm 62 is anchored to the end of the lever arm 56 remote from the anchor arms 30 by an anchor bolt 64 secured through the bifurcated terminal end 60 and one of the transverse bores 58. The end of the tension arm 62 remote from the bifurcated terminal end 60 has an endwise outwardly opening notch formed therein in which to seatingly receive the upper end of cylinder portion 66 of the McPherson strut assembly 12 and one base end of an anchor chain 68 is anchored thereto and the free end of the anchor chain 68 may be looped about the cylinder portion 66 and adjustably anchored relative to a slotted anchor 70 carried by the tension arm 62.

Figure 2:
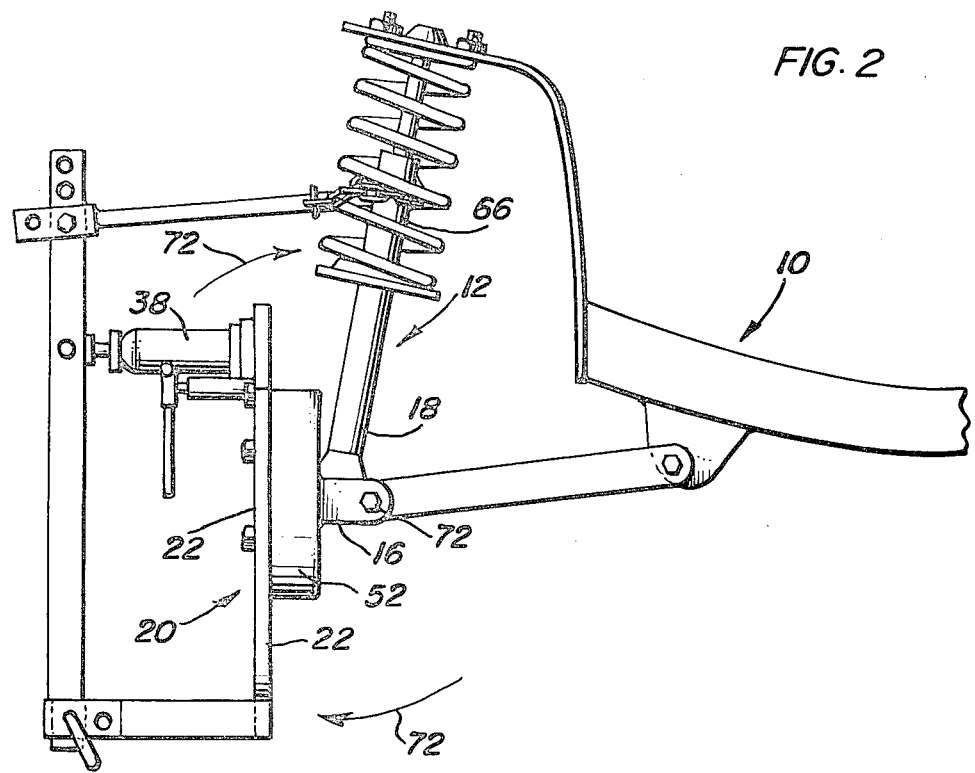
FIGS. 2 and 3 are elevational schematic views illustrating the manner in which opposite bending forces may be applied to the lower end of a McPherson strut tool.

When the alignment device is mounted as illustrated in FIGS. 1 and 2 of the drawings, extension of the hydraulic jack 38 will cause angular displacement of the mounting plate 22 in the direction of the arrows 72 in FIG. 2 and the strut assembly 12 to bend in the area 18.

Figure 3:
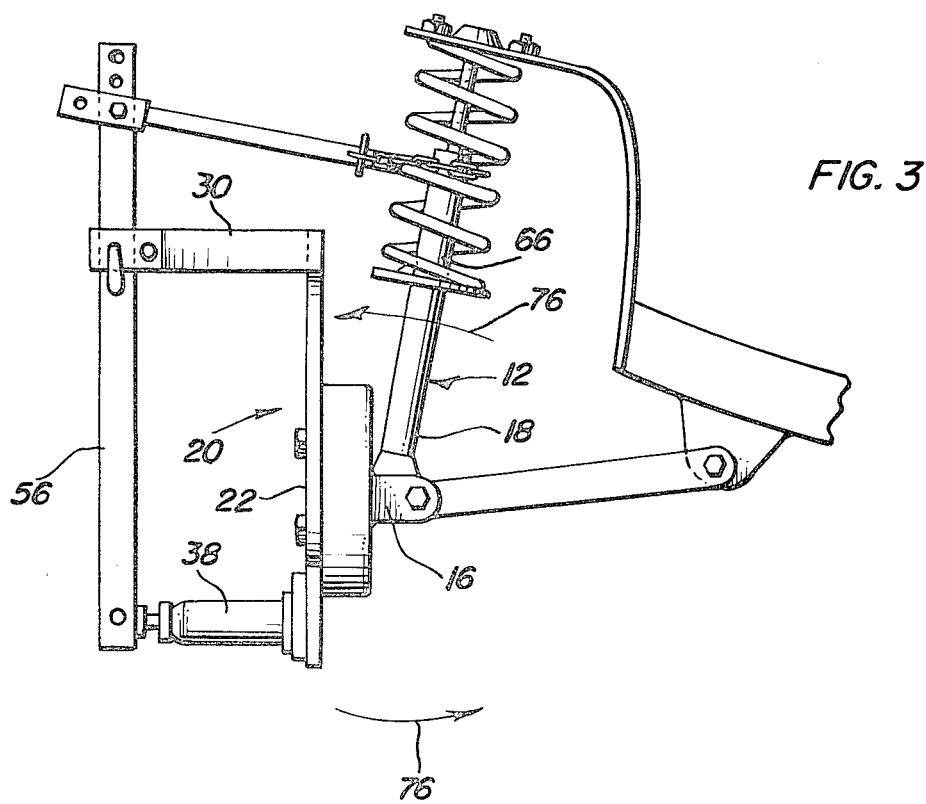

If, on the other hand, a reverse adjustment of the camber of the spindle 16 is to be effected, the bolt 44 may be removed and installed in the bore 42 and the mounting plate 22 may be rotated so as to be inverted relative to the position thereof illustrated in FIG. 2 and as shown in FIG. 3. However, the free ends of the anchor arms 30 are pivotedly anchored to the lever arm 56 by the anchor pin 34 passed through the outer ends of the anchor arms 30 and the central bore 74 formed in the lever arm 56. In this manner, when the hydraulic jack 38 is extended, the wheel mounting portion of spindle 16 will be angularly displaced in the direction of the arrows 76 as shown in FIG. 3.

It is believed most important to note that the arm portions 26 and 28 each act as lever arms in causing angular displacement of the wheel mounting portion of spindle 16 relative to the lower end of the McPherson strut assembly in the area 18 thereof. Thus, the total amount of force exerted by the jack 38 is reduced over that which would be required if only one lever arm portion 26 or 28 was being used. In addition, by using both lever arms 26 and 28 a more precise bending of the McPherson strut assembly at 18 may be effected inasmuch as there is less flexure in not only the mounting plate 22 but also the wheel mounting portion or spindle 16 before the desired bending of the strut assembly as at 18 is effected. Accordingly, through the utilization of magnetic gauges, extremely accurate bending of the strut assemblies 12 may be effective.

Figure 4:
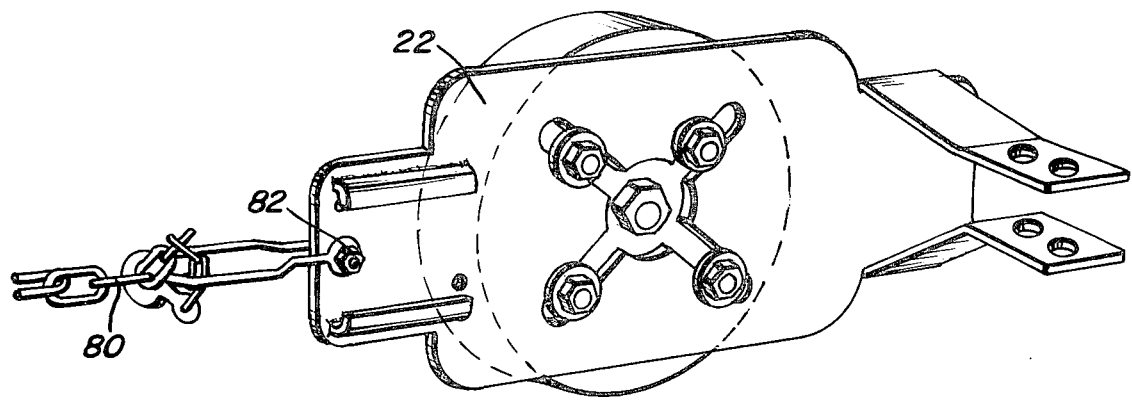
FIG. 4 is a perspective view illustrating the manner in which the adapter portion of the device may be used to correct fore and aft positioning of an associated wheel.
Figure 5:
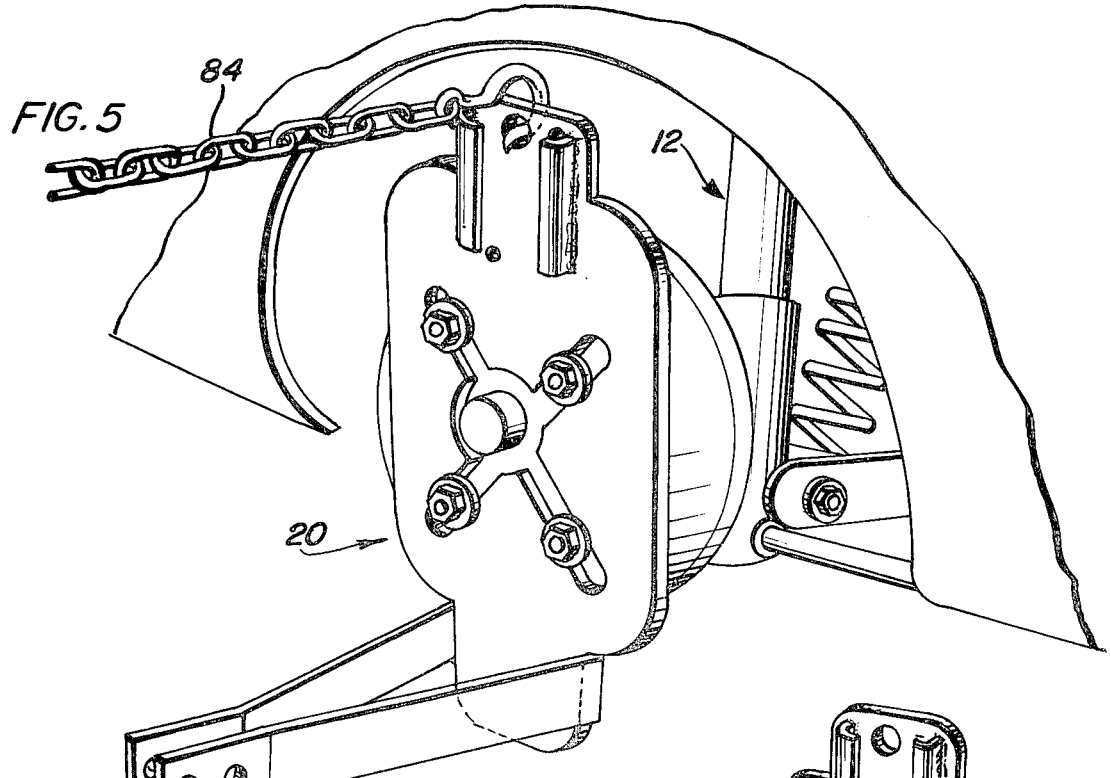
FIG. 5 is a perspective view illustrating the manner in which the adapter portion of the device may be used to simultaneously make a camber adjustment and outwardly displace an associated vehicle wheel hub mounting portion.

With attention now invited more specifically to FIGS. 4 and 5 of the drawings, it may be seen that wheel alignment or positioning may also be effected in a fore or aft direction in the manner illustrated in FIG. 4 of the drawings with a pull chain 80 anchored to the mounting plate 22' by utilization of a bolt 82 passed through the aperture 40. In addition, the alignment device 20 may also be used in conjunction with a pool chain 84 in the manner illustrated in FIG. 5 of the drawings.

Figure 6:
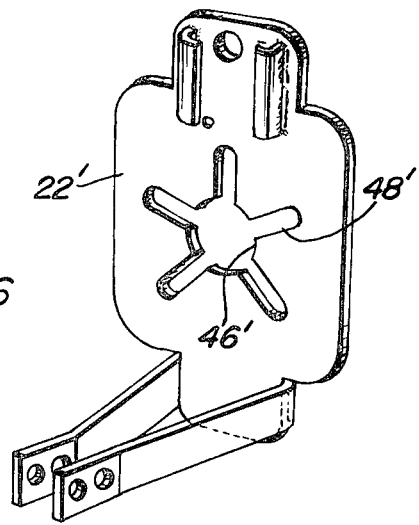
FIG. 6 is a perspective view of a slightly modified adapter portion of the device.

With attention now invited more specifically to FIG. 6, modified form of mounting plate 22' may be seen. The mounting plate 22' is identical to the mounting plate 22, accept that the central opening 46' of the mounting plate 22' is equipped with five radial slots 48' corresponding to the four radial slots 48', Of course, the five radial slots 48' adapt the mounting plate 22' for use and conjunction with drums, rotors, or non-breaking hubs equipped with five wheel mounting studs or lug bores.

The foregoing is considered as illustrative only of the principles of the invention. Furter, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wheel alignment device for use in correcting the caster and the camber of vehicle wheels supported from McPherson strut-type suspension units and designed for controlled bending of the lower end of an associated unit, said device including a mount having a central portion defining first and second sides and provided with a plurality of openings therethrough for support of said mount from a vehicle hub wheel mounting portion in lieu of the wheel normally mounted on said hub and with said first side opposing said hub, said mount also including remote lever arm portions extending outwardly from said central portion in opposite directions generally normal to a ray normal to said first side, an anchor arm carried by the outer end portion of one of said lever arm portions and projecting outwardly of said second side of said mount, an elongated lever arm, means supporting one end portion of said lever arm from the outer end of said anchor arm for oscillation about an axis transverse to said lever arm and said anchor arm and with the other end portion of said lever arm spaced laterally outwardly from second side of said mount in registry with the other lever arm portion, jack means operatively associated with said other end portion of said lever arm and said other lever arm portion for jacking the latter away from the former, and elongated tension member means including means on a first end thereof for releasable anchoring to the upper end portion of a McPherson strut and means on the other end thereof for selective releasable connection to a first of said end portions of said lever arm.

2. The alignment device of claim 1 wherein said first of said end portions comprises said other end portion.

3. The alignment device of claim 1 wherein said first of said end portions comprises said one end portion.

4. The alignment device of claim 1 wherein said mount comprises a thick plate member and said lever arm portions comprise interval portions of said plate member.

5. The alignment device of claim 4 wherein said other lever arm portion includes means for releasable monting of a bottle jack therefrom.

6. The alignment device of claim 1 wherein said other lever arm portion includes means for releasable mounting of a bottle jack therefrom.

7. The alignment device of claim 1 wherein said anchor arm comprises a pair of generally parallel spaced apart arm members having corresponding ends anchored relative to one of said arm portions and between which the corresponding portion of said elongated lever arm is received.

8. The alignment device of claim 1 wherein said central portion of said mounting plate includes a central opening having a plurality of radial slots opening radially inwardly thereof.

9. The alignment device of claim 1 wherein said other of said lever of arm portions includes tension member anchoring structure by which one end of a tension member may be anchored relative thereto.

10. The alignment device of claim 1 wherein said anchor arm comprises a pair of generally parallel spaced apart arm members having corresponding ends anchored relative to one of said arm portions and between which the corresponding portion of said elongated lever arm is received.

* * * * *